J. A. FRAUENHEIM.
APPARATUS FOR MAKING COMPOUND TWISTED BOLTS.
APPLICATION FILED DEC. 29, 1914.
1,226,497.
Patented May 15, 1917.
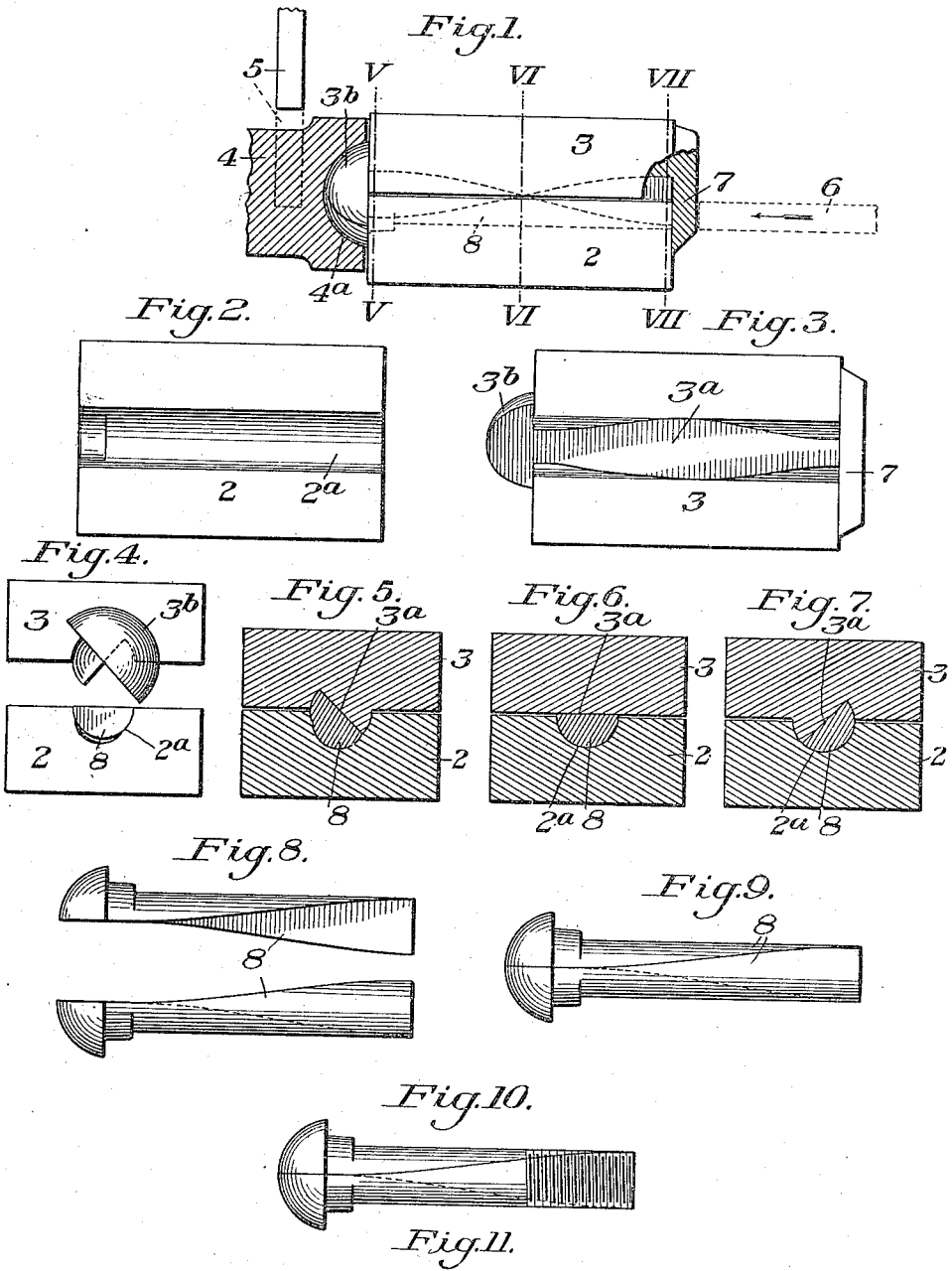

UNITED STATES PATENT OFFICE.

JOSEPH A. FRAUENHEIM, OF PITTSBURGH, PENNSYLVANIA, ASSIGNOR TO KERNER MANUFACTURING COMPANY, OF PITTSBURGH, PENNSYLVANIA, A CORPORATION OF PENNSYLVANIA.

APPARATUS FOR MAKING COMPOUND TWISTED BOLTS.

1,226,497.        Specification of Letters Patent.      Patented May 15, 1917.

Application filed December 29, 1914. Serial No. 879,456.

*To all whom it may concern:*

Be it known that I, JOSEPH A. FRAUENHEIM, a citizen of the United States, residing at Pittsburgh, in the county of Allegheny and State of Pennsylvania, have invented a new and useful Improvement in Apparatus for Making Compound Twisted Bolts, of which the following is a full, clear, and exact description, reference being had to the accompanying drawings, forming part of this specification, in which—

Figure 1 is a side elevation partly in section of the dies for forming the complementary members from which the bolts are built up;

Fig. 2 is a plan view of one of the die members;

Fig. 3 is an inverted plan view of another of said die members;

Fig. 4 is an end view of the die members shown in Figs. 1 and 2.

Figs. 5, 6, and 7 are sectional views on the lines V—V, VI—VI and VII—VII, respectively, of Fig. 1;

Fig. 8 is a side elevation of two of the complementary members which have been separated;

Fig. 9 is a similar view showing the members in proper relation to each other;

Fig. 10 is one form of a finished bolt; and

Fig. 11 is another form of a finished bolt.

This invention relates to improvements in an apparatus for the manufacture of compound twisted bolts formed of a plurality of complementary members; and is designed to provide an apparatus by which bolts of this character can be accurately and rapidly made.

The precise nature of my invention will be best understood by reference to the accompanying drawings, which will now be described, it being premised, however, that various changes may be made in the details of construction of the forming members, without departing from the spirit and scope of my invention as defined by the appended claims.

In the drawings, the numeral 2 designates one of the die members, and 3 the other member. 4 designates a heading tool, and 5 a stop for the blank, which is adapted to be moved into proper position with relation to the die members 2 and 3, to stop the forward movement of a blank, such as indicated at 6.

7 designates a shear member, which I have shown as being carried by the die member 3, although this shear member might be connected in any other way and operated independently of the die member 3.

The die member 2 has a semicylindrical blank-receiving cavity $2^a$, while the member 3 has a helical die surface $3^a$, which corresponds in form to the form of the inner face of the finished bolt blank or section. As will be seen by reference to Figs. 5, 6 and 7, this helical face is twisted through an angle of approximately ninety degrees. When the two die members are brought together upon a headed blank, the latter is not only shaped down into the desired form, but it is also given a helical twist by reason of the action of the die surface $3^a$. The precise form of this die surface will, of course, depend upon the amount of twist which it is desired to give the bolt section, as well as upon the number of sections to be used in forming a bolt.

The die member 3 also has at one end a projection $3^b$, which corresponds in form to one-half of a bolt head, and which is adapted to enter the heading recess $4^a$ of the heading tool 4.

The blank 6 is moved into the die member in the direction indicated by the arrow, until it engages the stop 5, which has been advanced to a position between the heading tool 4 and the die members 2 and 3, as indicated in dotted lines in Fig. 1. The die member 3 is then moved downwardly to shear off a section, such as indicated at 8, between the dies in Fig. 1, and at the same time, to twist the blank about the axis of the curved portion of the die members. After the blank has been twisted, the heading tool 4 is moved toward the die members to upset the head on the end thereof, the half-head portion $3^b$ on the member 3 coöperating with the recess $4^a$ to center the heading tool 4.

After the blanks have been formed in the manner described, two of the blanks are placed together and held in any manner at the headed end, and are then threaded at the other end. If it is desired to form bolts such as shown in Fig. 11, the heading tool will not be used.

In the drawings, I have shown dies for forming semicylindrical bolt members, so that the finished bolt will be built up of two similarly shaped members, but it will be readily understood by those familiar with the art that bolts having any number of complementary members can be made by my method and apparatus.

The advantages of my invention result from the provision of means for die-forming twisted complementary members for compound bolts, whereby the blanks or members are twisted about the center of the arc of a curved portion of the blanks. Also, from the provision of means for upsetting the headed portions on the ends of said members, together with means on one of the die members for centering the heading tool.

By the use of an arrangement of this character, the heading tools used today can readily be used in connection with dies, such as shown in the drawings, as it will only be necessary to form a portion of the head on one of the die members. Inasmuch as all the sections may be made in the same dies, they can be assembled indiscriminately and will accurately fit each other to form the finished bolts, which will be without substantial variation. By simply changing the die member 3 to one having a different form of projection 3$^b$, together with the heading tool, the style of head can be varied without changing the die members 2 and 3.

I claim:

1. Apparatus for forming semi-blanks for twisted compound bolts, comprising die members movable relatively to each other and in a transverse direction relative to the blank, one of the members having an arc-shaped recess extending across the entire face thereof and the other member having a helically curved face arranged to engage a flat face of the blank and rotate portions of the blank over the arc-shaped face of the other member to twist the blank, substantially as described.

2. Apparatus for forming semiblanks for twisted compound bolts, comprising die members movable relative to each other and in a transverse direction relative to the blank, one of the members having an arc-shaped recess extending across the entire face thereof and the other member having a helically curved face arranged to engage a flat face of the blank and rotate portions of the blank over the arc-shaped face of the other member to twist the blank, and a heading tool adapted to form one-half of a head on one end of the blanks, substantially as described.

3. A die for shaping semi-cylindrical twisted members for compound bolts, comprising a plurality of members movable relatively to each other, one of said members having an arc-shaped recess and the other member having a helically curved shaping face, said face being approximately flat transversely at all points throughout its length, substantially as described.

4. A die for shaping members for twisted compound bolts, comprising a plurality of members movable relatively to each other, one of said members having an arc-shaped recess extending across the entire face thereof, and the other member having a helically curved shaping face, said face being approximately flat transversely at all points throughout its length, and a third die member having a head-forming recess arranged to be moved toward the other member to upset a head on the end of the blank, substantially as described.

5. A die for shaping members for twisted compound bolts, comprising a plurality of members movable relatively to each other, one of said members having an arc-shaped recess, and the other member having a helical shaping face curved about the center of the arc-shaped recess, and a third die member having a head-forming recess arranged to be moved toward the other member to upset a head on the end of the blank, and one of the first named members having a projection which coöperates with the head-forming recess to center the heading tool and to shape the head of the blank, substantially as described.

In testimony whereof, I have hereunto set my hand.

JOSEPH A. FRAUENHEIM.

Witnesses:
 Geo. B. Bleming,
 H. M. Corwin.

Copies of this patent may be obtained for five cents each, by addressing the "Commissioner of Patents, Washington, D. C."